June 4, 1940.  K. W. FIEBER  2,203,460
APPARATUS FOR MEASURING FLUID PRESSURE
Filed March 8, 1938
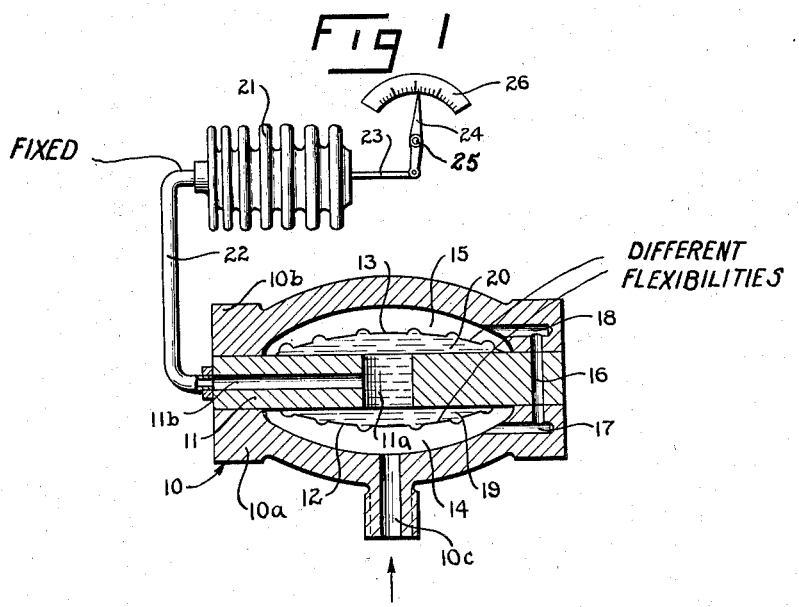
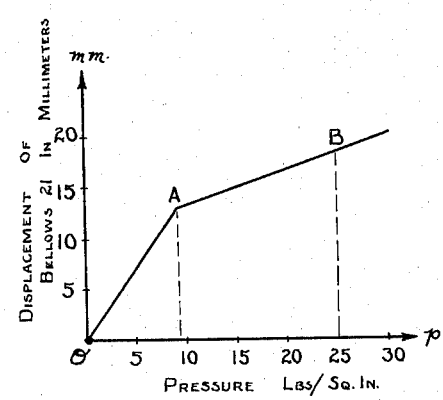
INVENTOR.
Karl Wilfrid Fieber
BY Stephen Cerstvik
ATTORNEY.

Patented June 4, 1940

2,203,460

UNITED STATES PATENT OFFICE

2,203,460

APPARATUS FOR MEASURING FLUID PRESSURE

Karl Wilfrid Fieber, Berlin-Charlottenburg, Germany, assignor to Siemens Apparate und Maschinen Gesellschaft mit beschränkter Haftung, Berlin, Germany, a corporation of Germany Application March 8, 1938, Serial No. 194,678
In Germany April 19, 1937

1 Claim. (Cl. 73—110)

This invention relates to measuring apparatus and in particular to apparatus for measuring fluid pressure.

One of the objects of the present invention is to provide a novel pressure gauge which is particularly sensitive to pressures of low values.

Another object of the invention is to provide novel fluid pressure measuring means which is accurate over a wide range of pressures.

A further object is to provide novel pressure indicating means wherein the effect of temperature changes upon the indications is reduced to a minimum.

Another object is to provide novel means for measuring pressures wherein the degree of sensitiveness of said means progressively changes as the pressure increases.

An additional object is to provide novel fluid pressure measuring means wherein a single scale will indicate pressures over a wide range.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention, reference being primarily had for this latter purpose to the appended claim.

In the drawing,

Fig. 1 is a side elevation, partly in section, of one embodiment of the invention; and, Fig. 2 is a graphic representation of values of the displacement of the indicating means plotted against the pressure causing the displacement.

The form of the invention shown in the drawing, by way of example, is a fluid pressure measuring device wherein membranes of different pliability are employed to produce varying degrees of sensitiveness of the apparatus. At low pressures, the membranes of low pliability cannot be distorted a sufficient amount to give accurate pressure indications but said membranes are necessary for higher pressures. Membranes of high pliability are not well adapted for indicating high pressures because the excessive distortion thereof necessitates indicating scales of undesirable size. Consequently, membranes of different pliability are used in combination and means are provided for rendering said membranes inoperative in the order of the flexibilities thereof as the pressure increases. Two membranes are employed in the illustrated device which form an envelope upon which the pressure acts. As the pressure increases, the more pliable membrane of the two, on reaching its upper operating limit, comes in contact with a supporting surface and no longer moves. The second and less pliable membrane, however, will not reach its limit of operation until later and will continue to move and to actuate the indicating means. The envelope formed by the two membranes is filled with a suitable pressure agent, such as a liquid, which, preferably, has a low coefficient of expansion and is not appreciably influenced by temperature changes. Both membranes, by means of the pressure agent, actuate a common indicating means.

In the form illustrated in Fig. 1, the novel pressure measuring device is constituted by a pressure chamber or housing 10 comprising hollow plate portions 10a, 10b, the former of which is provided with a central inlet 10c for a fluid, the pressure of which is to be measured. Interposed between plates 10a and 10b is a disc 11 having a central bore 11a which is in communication with the periphery of said disc through a conduit 11b. Interposed between the faces of disc 11 and plates 10a, 10b, respectively, are membranes 12 and 13. These membranes, at the circumferences thereof, are clamped between said disc and plates and held therebetween in fluid-tight engagement by suitable bolts (not shown) which engage said disc and plates. Plates 10a and 10b form with membranes 12 and 13, respectively, outer pressure chambers 14 and 15 which are in communication by means of a conduit 16 in said disc registering with conduits 17 and 18 in plates 10a and 10b, respectively.

In order that a sensitive indication of pressures of low values may be provided, membrane 12 is relatively more pliable than membrane 13. Said membranes are normally inflated by a suitable pressure agent, for example, oil or some liquid having a low coefficient of expansion. When distended by said agent the membranes form with disc 11 inner pressure chambers 19 and 20, respectively, which are interconnected by the central bore 11a in said disc. This pressure agent constitutes the means for communicating the distortion of the membranes to pressure responsive indicating means, as will later appear.

In order for said membranes to be distended by a pressure agent, as a liquid, a pressure must be exerted upon the agent. Means are accordingly provided which yieldingly exert said pressure upon the enclosed liquid comprising a bellows 21 which is normally contracted and which is in communication with bore 11a via conduit 11b by means of a tube 22. Bellows 21 is anchored at one end and connected at the free end thereof by a rod 23 with a pointer 24 pivotally mounted intermediate the extremities thereof at 25. Pointer 24 indicates on a scale 26 the movements of the bellows 21.

In operation, a fluid, the pressure of which is to be measured, flows into housing 10 through inlet 10c, filling chambers 14 and 15, and exerting a pressure upon membranes 12 and 13. Both of said membranes are distorted simultaneously and pressed inwardly toward one another. However, since membrance 12 is the more pliable of the two, it is distorted or pressed inwardly at a rate greater than that of the latter. Thus, the pressure agent in both chambers 19 and 20 will be forced therefrom into bellows 21 to expand the latter and to actuate pointer 24 in response to said distortion. Due to the greater pliability of membrane 12, there is provided a sensitive indication of the lower pressures, within the range of operation of said membrane. As the pressure increases, the membrane 12 will be pressed flat against the face of disc 11 and the upper limit of operation of the membrane will be reached. A further increase in pressure will distort only the stiffer membrane 13 which will continue to be pressed toward disc 11 to force the pressure agent to bellows 21 and to move pointer 24 until this membrane also is pressed flat against disc 11, whereupon pointer 24 will be displaced a maximum amount.

A graphic representation of the operation of the apparatus is given in Fig. 2 wherein, for example, pressure in lbs./in.$^2$ is plotted against the displacement of bellows 21 in millimeters. Assume that the membrane 12 reaches maximum distortion and is pressed flat against disc 11 at nine lbs./in.$^2$. Also assume that membrane 13 reaches maximum distortion and is similarly pressed against said disc at twenty-five lbs./in.$^2$. As the fluid pressure increases from zero to nine lbs./in.$^2$ both membranes are distorted and bellows 21 is moved, for example, thirteen millimeters. At this pressure, membrane 12 is pressed flat against disc 11 and goes out of operation. In order to move bellows 21 an additional ten millimeters a pressure change not of nine lbs./in.$^2$ but, for example, of sixteen lbs./in.$^2$ is required to act upon membrane 13. The slope of the line OA produced during the pressure change of the first nine lbs./in.$^2$ indicates the sensitiveness of the apparatus as compared to the slope of line AB produced during the pressure change from nine to twenty-five lbs./in.$^2$.

There is thus provided a novel fluid pressure indicating apparatus which is particularly sensitive to low pressures. The measurements are accurate over a wide range of pressures and the apparatus permits the use of a single scale upon which may be calibrated the pressure between wide limits. Temperature changes have no appreciable effect upon the pressure indications. The apparatus is very simple in construction and employs a small number of working parts.

Although only one embodiment has been illustrated and described in detail, it is to be expressly understood that the invention is not limited thereto. For example, in the form shown, a corrugated metal, expansible and contractible vessel as bellows 21 is employed for actuating the indicating pointer; however, a suitable capsule or a suitable spring loaded piston and cylinder arrangement may be used instead. Various changes may also be made in the design and arrangement of the parts illustrated without departing from the spirit and scope of the invention, as the same will now be understood by those skilled in the art. For a definition of the limits of the invention, reference will be had primarily to the appended claims.

What is claimed is:

In a pressure indicator, two concave plates comprising a casing and defining a pressure chamber, a disc member having a central bore and being interposed between said concave plates, membranes secured to either side of said disc member and enclosing a pressure agent, one of said membranes being adapted to respond to pressures of one range within said chamber, the other of said membranes being adapted to respond to pressures of another range within said chamber, and means responsive to said pressure agent for indicating the distortion of said membranes.

KARL WILFRID FIEBER.